United States Patent

Heytmeijer et al.

[11] 3,961,106
[45] June 1, 1976

[54] METHOD FOR APPLYING WAX OR PLASTIC COATINGS TO GRANULAR MATERIALS

[75] Inventors: Herman R. Heytmeijer, Whippany; Elmer S. Panaccione, North Arlington, both of N.J.

[73] Assignee: The United States of America as represented by the Secretary of the Interior, Washington, D.C.

[22] Filed: Mar. 3, 1975

[21] Appl. No.: 554,834

[52] U.S. Cl............................ 427/221; 149/2; 149/21; 264/7; 264/13; 427/220; 427/384; 427/385; 427/422; 428/403; 428/407; 264/7;12;13
[51] Int. Cl.²................................................ B05D 7/00
[58] Field of Search........... 427/212, 215, 220, 221, 427/378, 422, 384, 385; 149/2, 21

[56] References Cited
UNITED STATES PATENTS

| | | | |
|---|---|---|---|
| 1,725,608 | 8/1929 | Zebulske | 426/306 |
| 2,199,087 | 4/1940 | Drill et al. | 427/422 |
| 2,685,537 | 8/1954 | Dunmire | 264/7 |
| 2,855,330 | 10/1958 | Griswold et al. | 427/422 |
| 3,080,292 | 3/1963 | Koff | 264/13 |
| 3,080,293 | 3/1963 | Koff | 264/13 |
| 3,321,426 | 5/1967 | Dorsey | 264/7 |
| 3,540,908 | 11/1970 | Carvell | 427/215 |
| 3,617,358 | 11/1971 | Dittrich | 264/12 |
| 3,677,808 | 7/1972 | Sheridan | 427/220 |
| 3,772,099 | 11/1973 | Ryan et al. | 149/18 |

FOREIGN PATENTS OR APPLICATIONS

| | | | |
|---|---|---|---|
| 45-7165 | 12/1970 | Japan | 264/13 |
| 609,560 | 10/1948 | United Kingdom | 264/12 |

*Primary Examiner*—Harry J. Gwinnell
*Assistant Examiner*—Dennis C. Konopacki
*Attorney, Agent, or Firm*—William S. Brown; Donald R. Fraser

[57] ABSTRACT

Method and apparatus are described for applying a wax or plastic coating to phosphor grains to be added to explosives for tagging purposes. The coating is obtained by spraying from a nozzle a homogenous mixture of molten coating material and phosphor grains and permitting the droplets thus formed to solidify during free fall through a cooling medium such as air. The coated phosphors thus obtained when incorporated into an explosive render the mixture less sensitive to friction and impact than the corresponding mixture employing uncoated phosphors.

7 Claims, 2 Drawing Figures

METHOD FOR APPLYING WAX OR PLASTIC COATINGS TO GRANULAR MATERIALS

BACKGROUND OF THE INVENTION

U.S. Pat. No. 3,772,099, issued Nov. 13, 1973, to Fredrick M. Ryan and Robert C. Miller and assigned to Westinghouse Electric Corporation is incorporated by reference herewith. This patent describes fluorescent tagging means for explosives to provide post detonation information comprising (1) a spotting phosphor which can be excited by UV radiation to provide a band-type emission and (2) a coding phosphor which emits a line-type emission.

Both phosphors are incorporated into cemented phosphor grains of fine particle size which are dispersed in the explosive. After an explosion, phosphor grains can be located by UV irradiation of the spotting phosphor and the information on the coding phosphor can then be decoded.

The spotting phosphor is typically an inexpensive phosphor emitting over a fairly broad region of the visible spectrum and is used primarily as a means of locating the phosphor grain. The coding phosphor, which is generally quite costly, contains information about the explosive, such as the manufacturer and the type. This information is contained in a binary code which is established by the presence (or absence) of the specific fluorescence emissions of each coding phosphor.

While very effective for their intended use, it has been found that the hard abrasive phosphor grains greatly increase the impact and friction sensitivity of the explosive. As is obvious, this poses a serious problem particularly when the grains are to be added to normally sensitive explosives such as gelatinous type dynamites.

CROSS REFERENCE TO RELATED APPLICATION

Reference is made to copending application Ser. No. 554,838, By Heytmeijer and Panaccione, filed Mar. 3, 1975, relating to wax or plastic coated phosphor grains.

SUMMARY OF THE INVENTION

This invention relates broadly to coating particulate material with a coating layer by spraying a homogenous slurry of the particulates with a liquified coating material through a venturi nozzle to produce spherical coated particles. Specifically, the invention is directed to a method for coating hard, dense phosphor grains with a wax or plastic coating by spraying a slurry of the grains in the liquefied coating material to produce spherical coated particles, and allowing the thus coated particles to harden.

Among the objects of this invention are:

1. To coat particulates, as for example phosphor grains, with a wax or plastic coating employing a method of spraying a mixture of coating material and phosphor grains.
2. To coat particulates as in (1) wherein the heated slurry of phosphor grains and coating material are sprayed through a venturi nozzle.
3. To coat particulates as in (2) wherein spherical droplets of coated grains leave the nozzle and are congealed by freely falling through a sufficient distance.
4. To coat phosphor grains as in (3) wherein the hardened coated grains are screened and the fraction having a diameter between about 417 and 1,400 microns separated for use in tagging explosives.

Further objects will become apparent from the following description of the invention and the appended claims.

FIELD OF THE INVENTION

This invention comprises a method for coating particulates with a wax or plastic by spraying a slurry of liquefied coating material and particulates such as phosphor grains.

DESCRIPTION OF THE PRIOR ART

Methods for coating particulates with a plastic or waxy coating by tumbling or by polymerization encapsulation are well known. However, it was found that when a molten coating material, e.g. carnauba wax, was sprayed on a tumbling mass of phosphor grains, it was difficult to prevent agglomeration when the quantity of wax was more than 40% by weight. In polymerization encapsulation in polyethylene, difficulties were encountered by settling of heavy grains in the carrier liquid and by inadequate polymer build-up. The patent to Zebulske 1,725,608 shows spray coating granular material wherein a dry material to be coated is contacted with a coating material in a spray nozzle. The patentee's process is intended for coating lightweight materials, such as sugar, powdered milk, etc., with low melting point materials such as chocolate. Denser solids coated with higher melting point materials are not shown. Obtaining uniform wax or plastic coatings on dense phosphor grains by this method is unlikely, and in any event, Zebulske does not show spraying a slurry of molten coating material and the particulate.

DESCRIPTION OF THE PREFERRED EMBODIMENT

This invention will be described primarily employing phosphor grains as the particulate material and wax or plastic as the coating agent. However, it is to be understood that the invention is broader than these components and encompasses particulate materials generally and liquifiable coating material which can solidify leaving the nozzle.

Coded phosphor grains used for post detonation identification purposes in explosives are small, hard and abrasive particles representing mixtures of various phosphors held together by a silicate type binder. The particle size of the grains has been optimized at 250–400 microns (thru 40, on 60 mesh) for maximum recovery after detonation consistent with minimum grain concentration in the explosive.

It was postulated that in order to reduce the abrasiveness of the phosphor grains, they should be coated with or encapsulated in wax, modified wax, or plastic. The desired encapsulation could be obtained by ejecting (spraying) a stream of molten wax material containing the grains from an orifice because the normal process of droplet formation would have to occur, taking place around the solid particles. It was obvious that several factors would make the use of standard, commercially available spray equipment difficult. These factors include:

1. rapid settling of the heavy phosphor grains (specific gravity=4 gms/cm$^3$) in the melt;
2. the requirement that the entire assembly is heated;
3. the need for specialized pumps (or blow vessels) to feed the highly abrasive melt to the spray gun;

4. the capability of spraying a melt/grain slurry into relatively large droplets (average size about 1 mm in diameter).

We have now found that these problems can be solved through a unique application of an air/gas venturi mixer. This device which in its normal application serves to intimately mix natural gas and air or oxygen for use in burners has, after minor alteration, been found to function surprisingly well as a spray nozzle for the types of mixtures it is desired to spray.

BRIEF DESCRIPTION OF THE DRAWING

Referring to FIG. 1 of the drawing, a vessel 1 containing a slurry 2 of molten coating material such as wax, modified wax or polyethylene and phosphor grains is located within an electrically heated oven 3. The temperature of the oven is such as to maintain the melt at the desired spray temperature during the operation, about 120°–130°C. Stirrer 4, having paddle 5 and motor 6 as shown, serves to agitate the slurry during the entire spray run to prevent settling of the grains and keep them evenly distributed in the melt. Other type agitators are satisfactory provided they do not cause vortexing or draw air into the melt which could cause cobwebbing during spraying. A nozzle 7 elevated at an angle of about 30° from the horizontal is located above the oven and has leading into it intake tube 8. A heating lamp 9 located above the venturi nozzle keeps it heated and prevents congealing of the slurry therein. Compressed air, nitrogen or other gas is admitted into the rear of the nozzle inlet 10, and spherical droplets emerge from the mouth of the nozzle 11 and congeal while falling into collector 12.

In order to assure complete solidification and adequate hardness, the nozzle should be at least about 25 feet above the product collector. The angle of the spray cone at the mouth of the nozzle is about 10° to 15°, so that up to 24 spray nozzles can be arranged in circular fashion feeding from the same melt tank without danger of the intermingling droplet streams. The latter is undesirable since recombination of droplets would take place. Some of the particles may travel in excess of 20 feet (measured horizontally), but most fall within 4 to 8 feet from the nozzle. The particles are collected and sized and the fraction in the −12 to +35 mesh range (417 to 1400 microns) is the optimum product for explosive tagging purposes.

Figure 2:
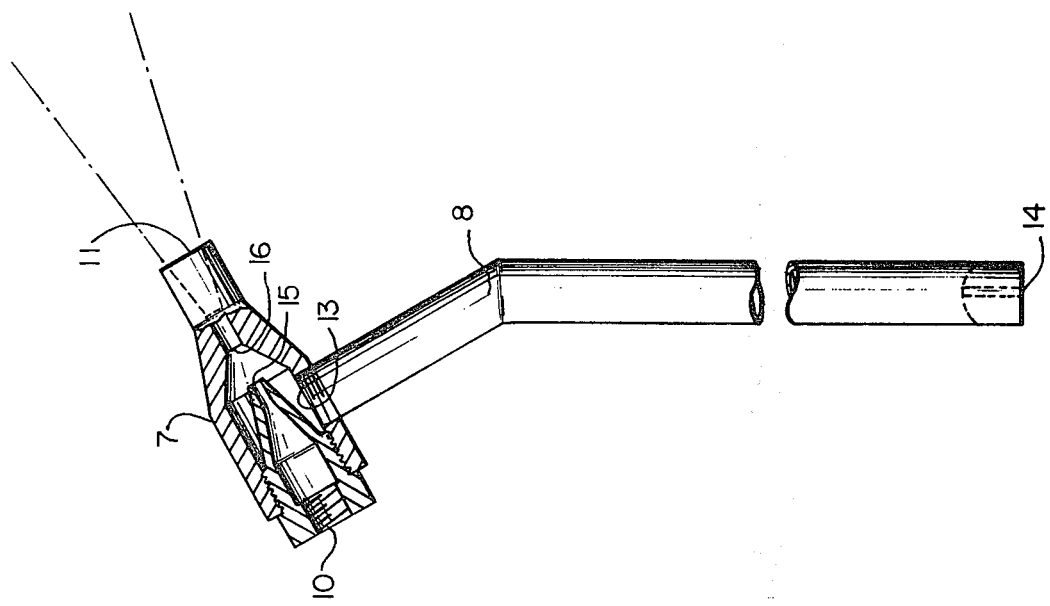
FIG. 2 is a view in front elevation of the spray nozzle and restricted feeder tube.

The nozzle structure and feed tube are shown in greater detail in FIG. 2. The nozzle 7 is essentially a commercial air/gas venturi mixer commerciallly available from the American Gas Furnace Company of Elizabeth, N.J. One minor modification is made therein as will be described hereinafter. As shown in FIG. 2, an angled suction tube 8 is threaded into what is ordinarily the "gas" inlet 13 in the venturi mixer. In the spraying operation air, nitrogen or other suitable gas is fed into the "air" inlet 10 under pressure and the melt is asperated into the mixer via the suction tube 8. Reference numerals 15 and 16 are the air orifice and throat orifice respectively of nozzle 7.

To obtain proper operation of the gun and satisfactory droplet formation the suction tube must be provided with a restricting orifice 14 of the right size at the inlet side of tube 8. When the orifice is too large, an excessively fine spray results while many of the ejected phosphor grains have only a very thin coating of wax (or resin). When too small an orifice is used, the melt simply flows out of the gun with only occasional spray formation but with much cobwebbing (blowing of fine wax or resin fibers). An orifice size of approximately 0.13 inch as shown at 14 is optimum at least for the No. 11 body size venturi mixer.

Figure 1:
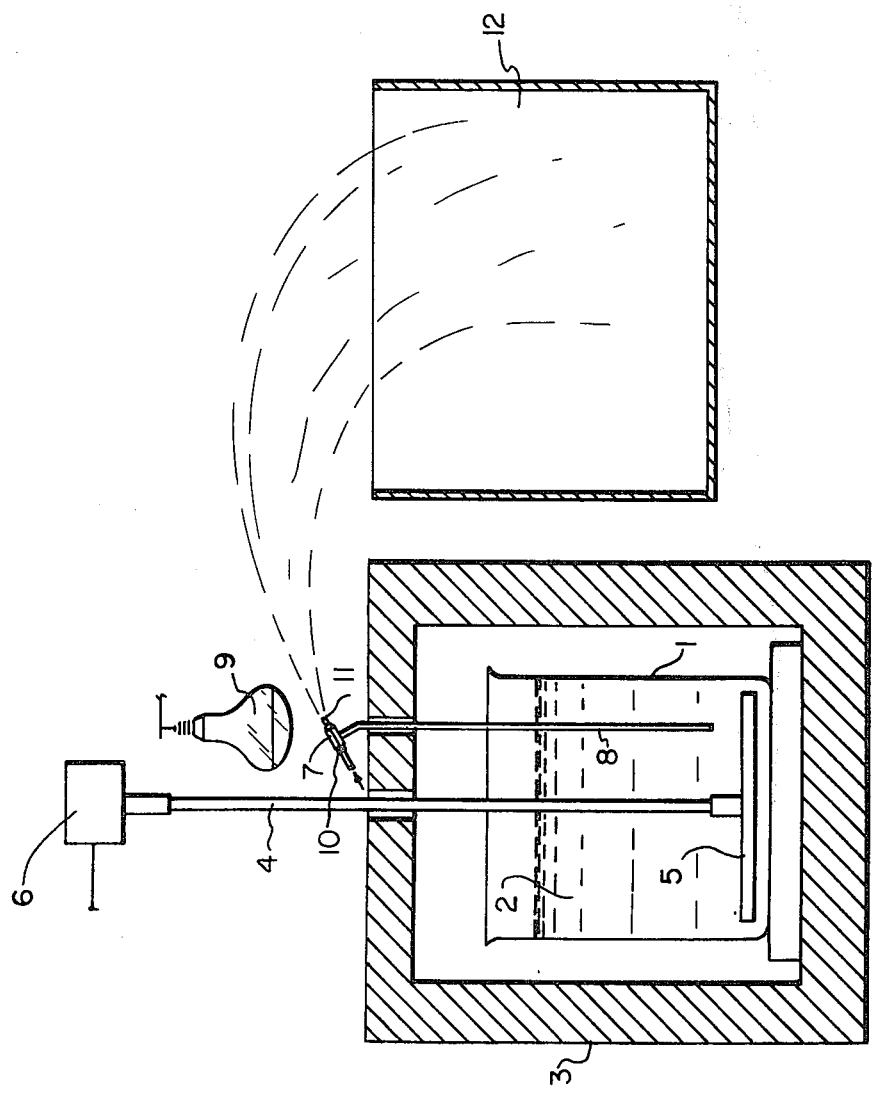
FIG. 1 is a schematic view of the spraying apparatus employed to coat the particulates.

The length of the venturi throat of the venturi mixer has been found to have a significant effect on the performance of the device as a spray gun. Cutting down the length of the venturi throat to about one-fourth inch or less aids in eliminating "drooling" (the flow of melt from the spray gun). While an electrically heated oven is shown in FIG. 1, other known means for heating the wax and keeping it molten could be employed.

Under certain operating conditions, as pointed out above, a large percentage of poorly coated phosphor grains are produced. However, even under optimum operating conditions a small percentage of poorly coated grains are collected with the product. It is imperative that these be removed since they have a sensitizing effect on sensitive explosives, as shown in our copending application Ser. No. 554,838.

Poorly coated grains are removed by the screening step previously described and the fine (smaller than 471 microns) and the coarse (larger than 1400 microns) fractions are recycled to the mixing vessel 1.

While various plastic and the petroleum, animal or vegetable waxes and mixtures thereof can be used to coat the particle, for best results the choice is limited to those that have such desirable properties as high melting point, strength, hardness, resistance to blocking (flow freely), lubricity and compatibility with the explosive. The melting point of the coating should be at least 70°C. and preferably about 100°C. to prevent softening of the coating and agglomeration of the coated grains during periods of high ambient temperature. Since the coated grains may have to be stored or transported under conditions of high ambient temperatures, the coating should retain its integrity and not become sticky below about 66°C. With regard to such properties as strength, hardness and lubricity, the coating material must be hard and strong enough to withstand easy deformation and "rub-off" yet soft enough to provide good lubricity under impact. The existence of a correlation between impact sensitivity of explosive/additive mixtures and the specific heat of the additive is described in declassified NRL Report A5463 entitled "Mechanisms Involved in the Impact Sensitivity of RDX Explosive Compositions", May 9, 1960. This report shows that the best desensitizers for explosives are those that have the highest specific heat. A paraffin wax had the highest specific heat of all the additives examined and was found to be by far the best desensitizer.

Straight paraffinic and microcrystalline wax are not suitable when the expected storage or shipping temperatures can exceed 150°F. since they tend to become soft and sticky at these temperatures. However, mixtures of one or both of these waxes with one or more of the following: carnauba wax, low molecular weight polyethylene, or ethylene/vinyl acetate copolymer (EVA) are acceptable. More than about 12% of EVA is generally to be avoided since it produces much "cobwebbing" during the spraying operation. The preferred coating material is low molecular weight polyethylene homopolymers, such as AC-6 and AC-16 made by Allied Chemical Corporation. Coloring agents, UV opacifiers and antistatic agents may be added to the coating composition, as disclosed in copending application Ser. No. 554,838.

The weight percent of phosphor grains in the melt can vary from 5 wt. % to about 25 wt. %, with the optimum percentage being from about 12 wt. % to about 20 wt. %. When sprayed as melts containing 1 part by weight of phosphor to 5 parts by weight of polyethylene, the finished screened product consists of small almost perfectly shaped balls, each containing one or more phosphor grains.

To obtain optimum performance of the spray gun, that is to say produce the highest percentage of coated grains in the optimum −12 +35 mesh range (417 to 1400 microns) at the highest rate and with minimum cobwebbing, it is necessary to balance out a large number of variables such as:

1. the overall size of the air/gas venturi mixer;
2. the opening size of its air orifice;
3. the opening size of the venturi tube;
4. the opening of the orifice in the feed tube through which the melt enters the gun;
5. the angle of the gun;
6. the temperature of the melt;
7. the air (or other gas) flow through the gun.

Typically, using a commercially available air/gas venturi mixer modified by shortening the venturi throat as indicated herein, having an air orifice opening of 0.039 inches and a venturi opening of 0.285 inches, a 0.13 inch feed orifice, a 15° gun angle, an air pressure of 16–18 psi and spraying an AC-6 polyethylene melt containing 16.7% by weight of phosphor grains at 125°C., the following results were obtained;

product - 68.8% by wt. in 12–35 mesh range
spray rate - 2640 gms/hour of 12–35 mesh grains.

1. A method for coating phosphor grains with a molten coating material, said coating material comprising at least one member of the group consisting of paraffin wax, microcrystalline wax, carnauba wax, and low molecular weight polyethylene, which comprises:
   a. forming a slurry of the phosphor grains and the molten coating material;
   b. heating the slurry to about 120°–130°C;
   c. stirring the slurry to prevent settling of the phosphor grains;
   d. spraying the slurry through a venturi nozzle whereby droplets are formed of grains encapsulated in coating material:
   e. permitting the droplets to solidify during free fall through air;
   f. collecting the coated phosphor grains.
2. The method of claim 1 wherein the gas stream is preheated.
3. The method of claim 1 wherein the introduction zone is heated.
4. The method of claim 3 wherein the gas in the gas stream is air.
5. The method of claim 1 wherein the phosphor grains are present in the slurry in an amount in weight percent of from about 5 wt. % to about 25 wt. %.
6. The method of claim 5 wherein the phosphor grains constitute about 16.7% of the slurry.
7. The method of claim 1 in which the coating material comprises low molecular weight polyethylene.

* * * * *